United States Patent [19]
Anderson et al.

[11] 4,065,074
[45] Dec. 27, 1977

[54] REEL SERVO CONTROL SYSTEM

[75] Inventors: David Robert Anderson, Murray; Wilbert Cleon Anderson, Salt Lake City; Vaughn Junior Jenkins, Bountiful, all of Utah

[73] Assignee: Sperry Rand Corporation, New York, N.Y.

[21] Appl. No.: 692,175

[22] Filed: June 2, 1976

[51] Int. Cl.² .............................................. G11b 15/58
[52] U.S. Cl. ...................... 242/184; 242/75.51; 318/6
[58] Field of Search ............... 242/184, 183, 182, 185, 242/75.51, 204, 189, 190; 318/6, 7; 226/49, 50, 51, 118

[56] References Cited
U.S. PATENT DOCUMENTS

| | | | |
|---|---|---|---|
| 3,137,453 | 6/1964 | Wooldridge, Jr. | 242/184 |
| 3,565,366 | 2/1971 | Campbell, Jr. | 242/75.51 X |
| 3,673,473 | 6/1972 | Werner | 318/7 |
| 3,809,328 | 5/1974 | Cope et al. | 242/184 |

*Primary Examiner*—George F. Mautz
*Attorney, Agent, or Firm*—John R. Flanagan; Marshall M. Truex

[57] ABSTRACT

A tape reel servo control system for use with a tape transport system wherein tape loop position within vacuum loop boxes is maintained by digital techniques as opposed to analog techniques. In normal operation when the tape loop deviates from an equilibrium position in one direction within a loop box, its associated reel is accelerated to move it back to its equilibrium position by means of a series of motor drive pulses whose pulse lengths are determined by the count registered in a counter wherein the count is varied in accordance with the difference between actual and required acceleration of the reel. When the tape loop deviates from the equilibrium position in the other direction, the reel drive motor is braked by electronically shorting its terminals until the tape loop moves back to its equilibrium position. When the direction of tape movement is changed, means are provided which override the normal control of the system and prevents tape damage by overrun into or removal of the tape from its associated loop box by applying a combination of motor braking and plugging current to the motor drive.

20 Claims, 5 Drawing Figures

REEL SERVO CONTROL SYSTEM

BACKGROUND OF THE INVENTION

A typical tape transport system uses vacuum loop boxes to compensate for the inertial difference between the tape reels which supply and take up the tape and the capstan which actually moves the tape in the forward and reverse directions past the read/write head. The vacuum loop boxes provide extra lengths of the tape between the supply reel and the capstan and the capstan and the take-up reel while at the same time maintaining tension on the tape. The capstan which has a lower mass and inertia relative to the supply and take-up reels accelerates to normal running speed relatively fast compared to the time it takes the high mass supply reel and take-up reels to reach normal running speed. These extra lengths of tape in the loop boxes give the supply and take-up reels time to attain the running speed of the capstan without the tape being damaged or broken as would be the case if loop boxes were not used.

However, use of vacuum loop boxes implies the need of a control system for maintaining the tape loops within predetermined limits in the vacuum loop boxes during deviations in speed between the tape reels and the capstan.

A typical tape transport system employs analog methods to control reel speed and acceleration. Such a system requires tachometer feedback to permit the control to operate on the difference between desired and actual acceleration of the tape reel to return the tape to an equilibrium position within the loop box. Such a system is cumbersome and has a relatively slow response time necessitating relatively long vacuum loop boxes to compensate for the slow response time.

The present invention contemplates a reel servo control system which employs primarily digital techniques as opposed to analog techniques. Such as system eliminates the need for tachometer feedback and comparison of analog voltages with its attendant disadvantages of slow response times and larger vacuum loop boxes. Use of a reel servo control system which primarily utilizes digital techniques which minimize analog components provides more precise control of reel speed and acceleration with a savings in cost and space as well as power conservation at the reel drive motors.

More specifically, the present invention comprises a reel servo system wherein a current programmer provides discrete current levels indicative of required motor acceleration to a current comparator having values dependent on the position of the tape within the loop box to a current comparator. The current comparator also receives an input of the current level in the reel drive motor which is indicative of actual motor acceleration which is driven by voltage drive pulses of a duration determined by the difference between the current inputs to the current comparator. The difference between the input to the current comparator is indicative of the acceleration needed to return the tape loops to their appropriate positions in their respective loop boxes. This current difference is sampled at the end of each reel motor voltage drive pulse and dependent on the sign of the difference it increments or decrements an up-down counter until the current difference is virtually zero. The count in the up-down counter is fed into a pulse width counter which counts down from that count to zero which determines the time duration of the reel motor drive pulse. Thus, the length of the reel motor drive pulse, which may be all or part of the duty cycle, is determined by the count in the up-down counter which is dependent on the negative or positive difference between actual reel acceleration and desired reel acceleration.

The present invention also includes overriding circuitry which provides braking and plugging current to the reel drive motors when the capstan reverses direction to provide rapid reel deceleration to maintain the tape within required limits of its appropriate loop box.

OBJECTS OF THE INVENTION

It is an object of the present invention to provide a tape reel servo control system employing digital techniques.

Another object of the present invention is to provide a tape reel control servo for use in a tape transport system wherein the use of digital techniques eliminates the need for tachometer type feedback to control tape loop position within a loop box.

A further object of the present invention is to provide a tape transport system wherein reel motor servo control utilizes digital means to vary the time duration of voltage drive pulses which control the reel drive motors.

Yet another object of the present invention is to provide a tape transport system wherein tape reel servo control is accomplished by digital means which require fewer components, less costly components, less power and less space than required with conventional analog means and provide for less costly and easier fabrication.

A still further object of the present invention is to provide a tape transport system wherein tape loop position in its loop box is controlled by digital means during normal control situations as well as during capstan direction reversal situations.

Other objects and many of the attendant advantages of the present invention will become more apparent with a reading of the following description in conjunction with the accompanying drawings.

DESCRIPTION OF THE INVENTION

Figure 1:
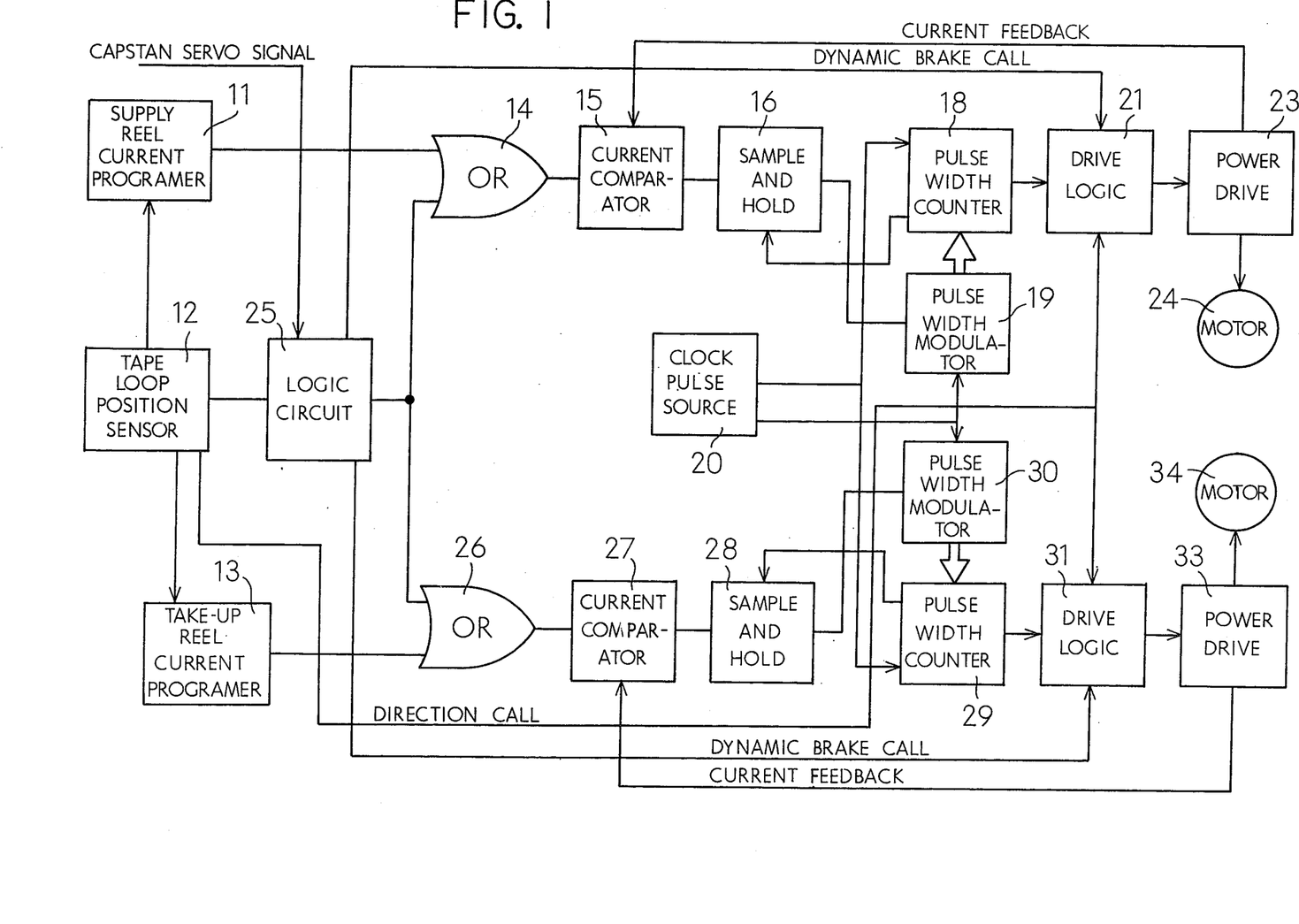
FIG. 1 is a block diagram of the reel servo control system of the present invention.

Referring now to FIG. 1, there is shown the tape reel servo control system of the present invention. Since there are two tape reels which are controlled, FIG. 1 shows a dual control system, i.e., one of each reel drive motor.

A supply reel current programmer 11 is connected to a tape-loop-position sensor 12. The tape-loop-position sensor 12 which effectively comprises a series of vacuum switches appropriately disposed in vacuum loop boxes detects the position and direction of motion of the tape within the vacuum loop boxes. The current programmer 11 in response to its inputs from the tape-loop-position sensor 12 provides as an output command for one of several discrete currents depending on the position of the tape in the loop box.

In a similar manner a take-up reel current programmer 13 is connected to the tape-loop-position sensor 12 which provides current programmer 13 with information of the position and direction of motion of the tape in a take-up loop box. The current programmer 13 provides several discrete current outputs depending on the position of the tape in the loop box.

Figure 2:
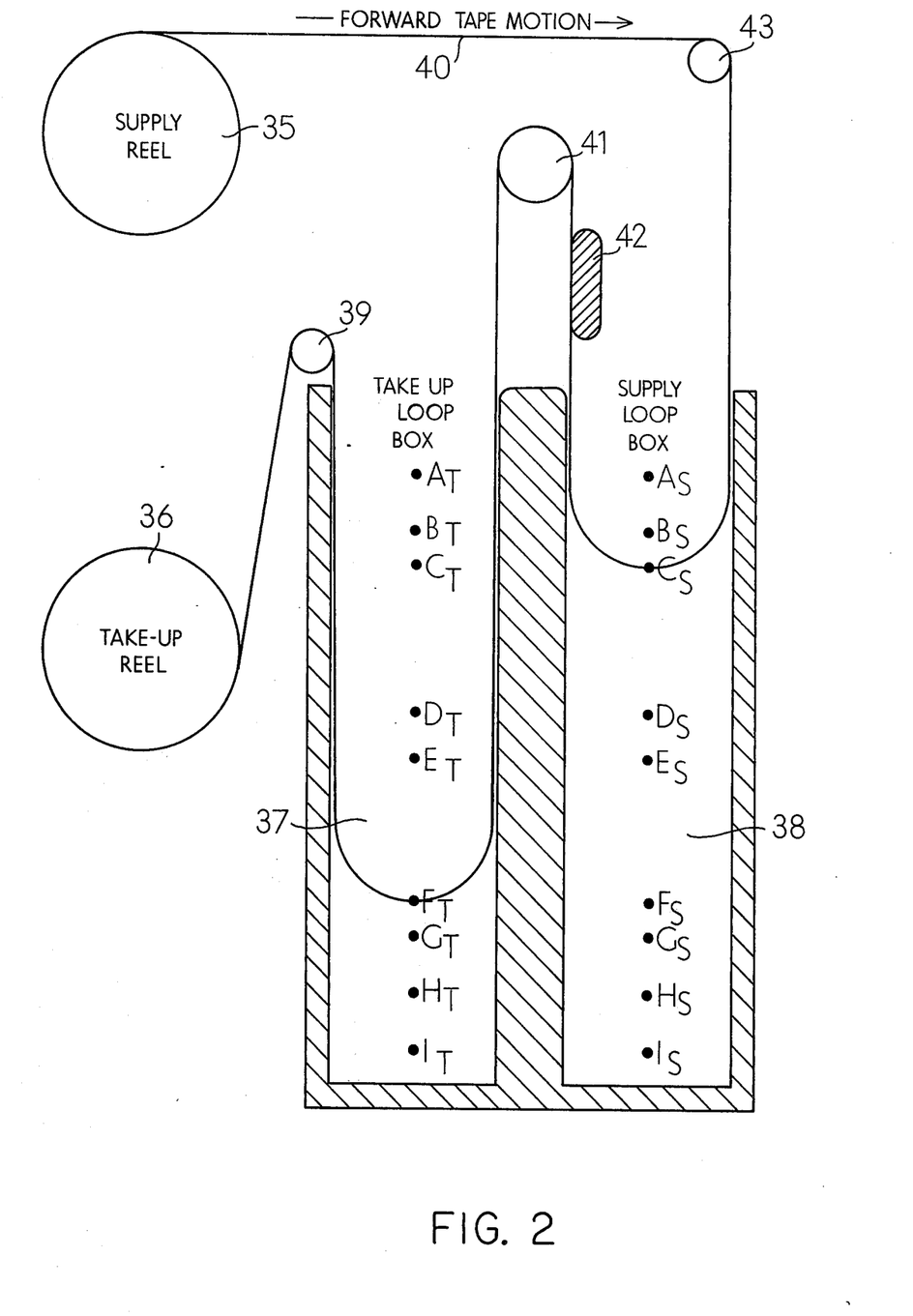
FIG. 2 is a representation of the tape transport system and particularly showing the vacuum loop box geometry.

The loop boxes 37 and 38 with their position sensor switches are shown in FIG. 2 and are discussed more fully hereinbelow.

Figure 3:
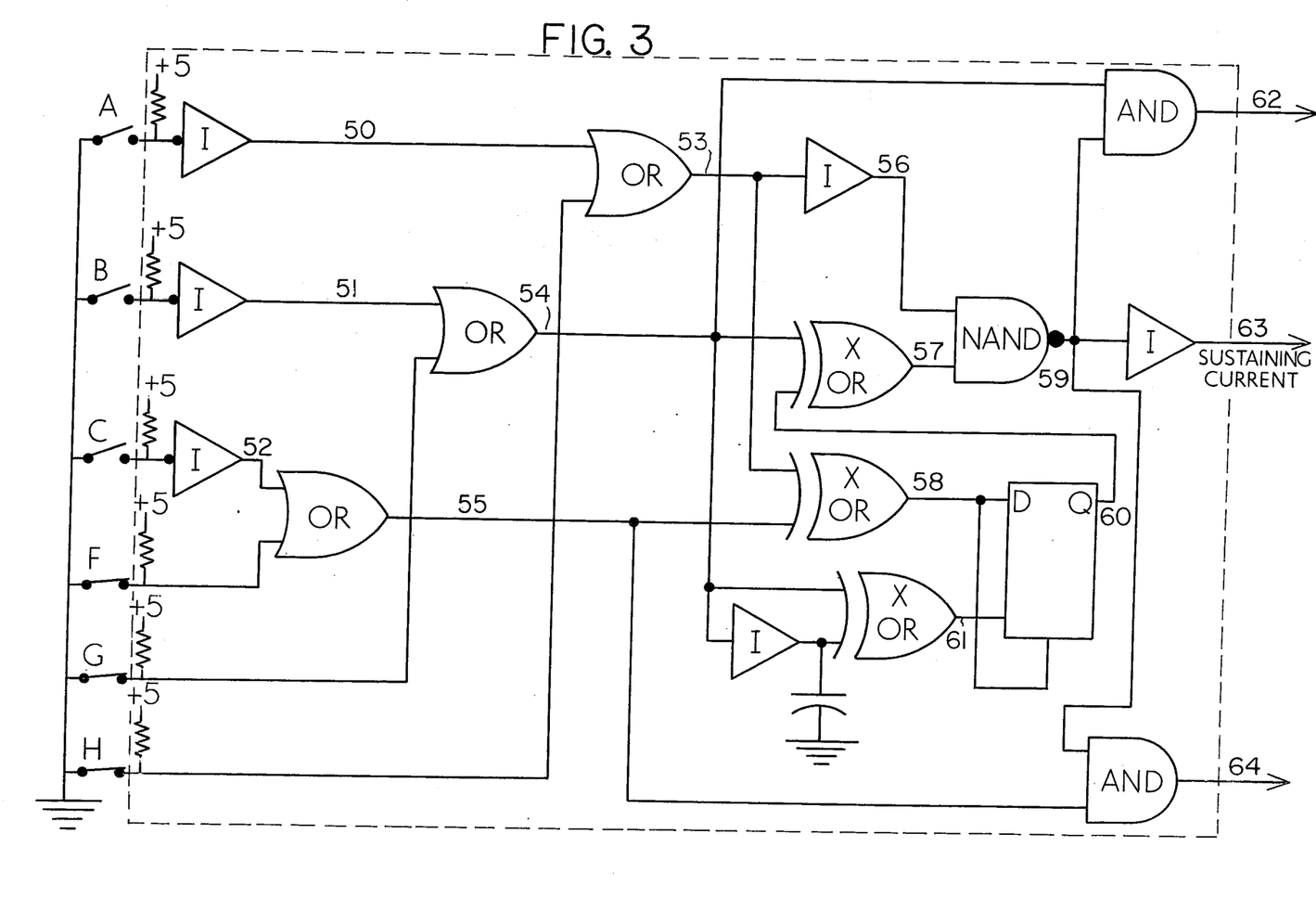
FIG. 3 illustrates the logic circuitry arrangement of the current programmer of the present invention.

The current programmers 11 and 13 which are pre-wired logic devices to be discussed more fully in reference to FIG. 3 are switched by means of the tape-loop-position sensor 12 to provide the several discrete current outputs discussed above.

The output of the supply reel current programmer 11 is connected to current comparator 15 via OR gate 14. The output of the current comparator 15 is connected to a sample and hold circuit 16.

The sample and hold circuit 16 has an output terminal connected to a pulse width modulation control generator 19 hereinafter referred to as up-down counter 19.

The sample and hold circuit 16 also has an input from a pulse width counter. The sample and hold circuit 16 functions to sample the output of the current comparator 15 at the conclusion of each reel motor drive pulse.

A clock pulse source 20 provides an input to pulse width counter 18 which itself provides an input to the sample and hold circuit 16. The pulse width modulation control generator 19 provided has an input terminal to pulse width counter 18 which, in turn, provides an input to drive logic 21. The drive logic 21 has an input terminal from tape-loop-position sensor 12 which provides information thereto indicative of the direction of the supply reel. The drive logic 21 provides an input terminal to power drive 23. The motor 24 has an input terminal from power drive 23 from which the motor is powered to drive the supply reel.

A logic circuit 25 which receives an input entitled CAPSTAN SERVO SIGNALS provides input terminals to OR gate 14 and drive logic 21. The power drive 23 provides an input terminal to current comparator 15 which provides a current feedback indicative of actual acceleration of the supply reel motor 24.

The take-up reel control arrangement is substantially identical to the supply reel control arrangement, except that each shares the blocks representing the tape-loop-position sensor 12, the logic circuit 25 and the clock pulse source 20.

The take-up reel control arrangement, therefore, has an OR gate 26, a current comparator 27, a sample and hold circuit 28, a pulse width counter 29, a pulse width modulation control 30, drive logic 31, power drive 33 and take-up reel drive motor 34. The various interconnections between these elements are identical to those discussed in reference to the supply reel control arrangement and need not be repeated here. The drive logic 31 has an input from the tape-loop-position sensor 12 indicative of take-up reel direction.

Before a more detailed discussion of the function of each of the above identified blocks and, where necessary a more detailed showing, the tape transport arrangement shown in FIG. 2 is described as it will be useful in discussion of the function of many of the above-mentioned elements as well as the overall operation of the present invention.

In FIG. 2, there is shown a supply reel 35 adapted to be driven by motor 24 and a take-up reel 36 adapted to be driven by motor 34. The tape transport also comprises a take-up vacuum loop box 37 and a supply loop box 38. The magnetic tape 40 which is supplied from supply reel 35 and stored on take-up reel 36 extends into loop boxes 37 and 38 substantially as shown in FIG. 2. The tape 40 extends around guides 39 and 43 and is transported past read/write head 42 by means of capstan 41. Capstan 41 is driven by a separate motor (not shown) for transporting the tape 40 past read/write head 42 in either direction.

The desirability in using loop boxes in a tape transport system is well known. Due to the high mass and, therefore, high inertia of tape carrying reels as opposed to that of the tape driving capstan, a tape storage buffer between each reel and the capstan prevents damage or breaking of the tape due to differences in speed between the reels and capstan. For example, when a capstan begins to drive tape or reverse direction, it accelerates to normal running substantially faster than the higher mass reels reach an equilibrium speed. Differences in speed may also occur during normal running. The extra lengths of tape provided by the loop boxes compensate for these differences in acceleration until the speed of the reels catches up to that of the capstan while at the same time maintaining tension on the tape. Thus, the use of loop boxes and the maintenance of tape loops within acceptable safe limits in the vacuum loop boxes are not only desirable but necessary for the effective operation of a tape transport system.

To this end, i.e., maintaining the tape loops within predetermined limits of the loop boxes, a series of vacuum switches: A, B, C, D, F, G, H and I are employed in each of the loop boxes 37 and 38. These switches and their relative placement provide information relating to the position of the tape loops within each loop box 37 and 38 as well as the direction of motion of the tape loops within each loop box 37 or 38.

Vacuum switches IT and IS near the bottom of loop boxes 37 and 38 detect tape loop fault, e.g., when the tape loops are extended too far into the boxes or are out of the boxes.

The vacuum switches A through I and their connections to current programmers 11 and 13 in effect make up the tape-loop-position sensor 12 shown in FIG. 1.

The reel control system may operate in the open loop or closed loop modes. The open loop mode includes the functions of tape loading and unloading of the tape. Open loop operation in the present system is handled by conventional methods and is not a feature of this invention and, as such, is not described herein.

The closed loop mode of operation is the normal running condition of the system. In this mode the supply reel 35 is ideally supplying tape, and the take-up reel 36 is taking up tape at an average speed equal to the speed at which the capstan 41 is moving the tape. Alternately, the take-up reel 36 may be supplying tape to the supply reel when the capstan 41 is running in the reverse direction. The system automatically functions to maintain the tape loops at their equilibrium positions within the loop boxes 37 and 38.

The closed loop mode also includes the situation where the tape direction is suddenly changed by the reversal of capstan direction. In this situation, the system automatically functions to stop the reel driving motors with the tape loop positioned so that the motors may be reversed in direction in a controlled manner.

Prior to detailed discussion of the various components of the present invention, a functional description of the operation is discussed.

In the closed loop, normal running condition where the system is in equilibrium, i.e., the tape loops are in their equilibrium positions in the vacuum loop boxes 37 and 38; the tape-loop-position sensor 12 provides inputs to both supply reel and take-up reel programmers 11 and 13 which call for no acceleration. Thus, no change in velocity of motors 24 and 34 is called for. However, this is an ideal condition never truly achieved in practice.

Where this equilibrium condition is disturbed in one or the other or both loop boxes 37 and 38, the system functions to speed up or slow down the appropriate reel drive motor. For purposes of brevity, only deviations of the tape loop in supply vacuum loop box 38 and control of the velocity of supply reel 35 are discussed inasmuch as the control of the velocity of take-up reel 36 is achieved in substantially the same manner.

Now consider that the rotation of reel 35 slows down by virtue of its drive motor 24 slowing down. This causes its loop to move up in the loop box 38 from its equilibrium position. This change in loop position is detected by the tape-loop-position sensor 12 and causes the current programmer 11 to provide an increased current to the current comparator 15 via OR gate 14 which is representative of the required acceleration of the motor 24 to return the tape loop to its equilibrium position.

The power drive 23 provides a feedback current to the current comparator 15. This current is representative of the actual acceleration of the motor 24.

The two currents are compared in the current comparator 15. The resulting comparison indicates to what extent the motor 24 must be speeded up to bring the tape loop back into the equilibrium position within the loop box 38.

In the example given the tape loop moved up in the loop box 38 indicating a slow down in the motor 24. Thus, the current from the power drive 23 is smaller than that from the current programmer 11 indicating that more voltage should be applied across the drive terminals of the motor 24. This decision is made by the sample and hold circuit 16 at the end of each motor drive pulse.

The motor 24 is driven by voltage drive pulses that have frequencies substantially higher than the electrical cutoff frequency of the servo motor wherefore the current in the motor will remain relatively constant when a voltage pulse train is applied. Further, the average voltage magnitude applied to the motor terminals is the power supply input voltage multiplied by the drive pulse length and divided by the drive pulse period. The technique wherein this invention achieves this pulse width modulation drive voltage will become more apparent hereinbelow.

Based on the results of each decision of the sample and hold circuit 16, the pulse width modulation control generator or up-down counter 19 is incremented or decremented one count. In the present example, it is incremented since the motor 24 requires more voltage. The count in the up-down counter 19 is loaded into pulse width counter 18 at the time a drive pulse is to begin. The pulse width counter 18 then determines the time duration of the next motor drive pulse.

The frequency of the drive pulse train is approximately 2 KHz; and there are only 16 different possible pulse widths that can be commanded from the counter 19; hence, the absolute maximum time required to establish the right count is eight milliseconds, which is almost insignificant with respect to the time constants of the servo motors. Thus, we do not care about initialization generally. However, we expect that under conditions of dynamic brake the level counter will count to the highest value which is advantageous in the dynamic brake/plugging current routine that occurs with capstan reversals.

The pulse width counter 18 counts down to zero from the number inserted into it by the pulse width modulation control generator 19 at which time the motor drive pulse is terminated; hence, depending on the count, the motor drive pulse occupies all or a portion of the available duty cycle. The length of the motor drive pulse is determined by the count in the pulse width modulation control generator 19 which is dependent on the magnitude of the difference between actual reel speed and desired reel speed.

This incrementing (or decrementing) of the count in the pulse width modulation control generator 19 occurs continuously at the end of each motor drive pulse until the output from the current comparator 15 becomes zero. In actuality the motor 24 never attains exact desired running speed, and the up-down generator 19 is always incremented or decremented one count dependent on the information in the sample and hold circuit 16, causing the motor 24 to hover about the desired speed and the tape loop to dither about the desired position in the loop box 38.

FIG. 2 depicts the tape transport system running in the forward direction. In this condition the equilibrium position for the tape loop in supply loop box 38 is in the vicinity of the C vacuum switch, i.e., it hovers about the C switch and is shown as actually on the C sensor switch. In addition the tape loop in take-up loop box 37 hovers in a similar manner about the F sensor switch. For the forward running condition, the normal control switches in the loop box 38 are the A, B and C switches while the normal control switches in the loop box 37 are the F, G and H switches.

When the tape transport is running in the reverse direction, the normal position for the tape loop in tape loop box 38 is about the F switch while the normal position of the tape loop box 37 is about the C switch with the normal control switches being F, G and H in loop box 38 and A, B, C in loop box 37.

The I switches indicate fault when one of the loops bottoms in its respective loop box or pulls out of its respective loop box. This indication is used to stop the tape transport, e.g., by shutting off power.

The D switch provides an indication of where the tape loop is with respect to the center of the loop box. Using this indication, the required servo motor direction can be specified to the motor drive logic shown in FIG. 5 thereby eliminating the necessity of distinguishing to the current programmer whether the tape loop is operating within the active drive region that exists above the C switch or that drive region below the F switch. Further, the D switch also provides an input to one shot logic 25, the function of which will be explained more fully below.

The E switch does not serve a useful purpose when the capstan is running. However, when the capstan stops the reel motors are also brought to rest by the servo system, there is required a small yet constant torque to be applied to the servo motors to counteract the force applied to the tape loops by the vacuum. This torque is developed by adjusting the count in the voltage level counter similar to the process already described such that the pulse length is extended if the loop is below the E switch and contracted if the loop is above the D switch and held constant if the loop is between the D and E switches. Thus, if the capstan is stopped, the servo system will settle the loop to a position between the D and E switches.

In FIG. 3, the switches A, B, C, F, G, and H of the loop box 38 are shown connected to the current programmer 11. The switches of loop box 37 are connected to the current programmer 13 in a similar manner.

The current programmers 11 and 13 contain logic which provides calls for discrete levels of current on their outputs dependent on the position and direction of movement of the tape loops.

For example, considering the supply loop box 38 and with the tape transport running forward, a deceleration of the supply reel 35 causes the tape loop to move up the loop box 38. If the tape loop crosses the C switch into the region between the B and C switches, the programmer 11 provides a discrete level of current at its output to current comparator 15. In a practical embodiment, this current is 4.5 amps. If the tape loop trips the B switch and then moves back into the region between the B and C switches, the current output call from the current programmer is changed to some low value as necessary to sustain but not increase the velocity of motor 24. When the tape loop is in the region between switches B and C and moves into the area between switches A and B, a high level current, e.g., 6.5 amps. is called for out of current programmer 11. If the tape loop is in the region above switch A and returns to the region between A and B (supply reel decelerating), the current call out of the current programmer becomes again simply a low value sustaining current (0 to 2 amps. as determined by the design). Thus, as the tape loop moves up in the loop box 38 and as the supply reel decelerates, appropriate levels of current are called by the current programmer 11 to the current comparator 15 to accelerate the motor 24 to cause the tape loop to move down the loop box. When the upward movement of the tape loop is sensed to have turned around, the acceleration of motor 24 is discontinued by a change in the output of the current programmer 11. Thus, motor over velocity is prevented and an attempt is made to simply maintain the velocity at a constant level by calling for a velocity-sustaining current at the output of the current comparator 11. When the tape loop goes below the C switch, the motor 24 is dynamically braked by electronically shorting its terminals and, in this way, is decelerated in a more positive fashion. The effect of this dynamic brake is to maintain the tape loop in the vicinity of the C switch whenever the capstan is moving the tape in the forward direction. Further, unless a capstan reversal occurs, the dynamic brake call shall always be active if the capstan is running and the tape loop is in the region between the C and F switches. This dynamic braking call overrides the pulse width modulation as treated in FIG. 5 and explained in greater detail hereinafter.

The foregoing description is also applicable to loop box 37 so that when the tape transport is moving in the forward direction, the switches F, G and H are the controlling switches. When the tape transport is running in the reverse direction, switches F, G and H of loop box 38 control the current programmer 11 while the switches A, B and C of loop box 37 control the current programmer 13.

During running of the tape transport in the forward or reverse directions, the currents called up by the current programmers 11 and 13 are indicative of the desired acceleration of the respective reels 35 and 36. These currents are applied to their respective current comparators. For example, the current comparator 11 provides its outputs to current comparator 15 where it is compared with a representation of the current of motor 24 which, as previously explained, causes the motor drive pulses to vary in duration with the cooperation of pulse width counter 18 and up-down counter 19.

FIG. 2 is also useful to illustrate the concept of braking and plugging current to bring a tape reel to a stop when the capstan 41 direction.

Assuming the tape transport is running in the forward direction, the tape loops are being maintained in their respective equilibrium positions shown in FIG. 2. Looking at loop box 38, it can be seen that a change in direction of the capstan 41 causes the tape loop to move relatively rapidly down the loop box 38. This movement is aided by supply reel 35 which is still moving tape into the loop box. When the capstan 41 reverses direction, a signal is supplied to logic circuit 25. This causes the logic circuit 25 to become active and to cause, for a time, a dynamic brake to be applied to the motor 24, i.e., a short on the motor terminals with a decelerating effect that is proportional to motor velocity and then, for a time if necessary, a plugging current, i.e., reverse current to the motor 24 which has a constant decelerating effect. More specifically, given that the capstan is moving tape forward and the tape loops are at the C and F switches of loop boxes 38 and 37, respectively, a capstan reversal will activate logic circuit 25 such that a dynamic brake will be applied to motor 24 as the tape loop moves down the loop box 38 until the D switch is crossed; thereafter, plugging current becomes effective. Likewise, a dynamic brake is applied to motor 34 as the tape loop moves up loop box 37 until the D switch is crossed.

As the tape loop moves down the loop box 38, the dynamic brake is applied until the D switch is crossed. At that time the plugging current becomes effective. For the worst case, i.e., a fully loaded supply reel running at top speed, the system is designed so that the dynamic brake and plugging current are sufficient to stop the supply reel 35. The length of region below the F switch is sufficient to allow time to accelerate the reel back from zero to full speed under worst case conditions. This places the tape loop in position near the F switch which is its equilibrium position in loop box 38 for reverse running of the tape transport.

The take-up reel 36 is likewise stopped when the tape loop in the loop box 37 has reached the vicinity of the C switch. At this time, the supply reel 35 and take-up reel 36 are accelerated until they reach the speed of the capstan 41 now moving tape in the opposite direction.

The logic circuit 25 is shown as a block for convenience. The logic circuit 25 functions in a conventional way to provide both plugging current and dynamic brake calls to both the supply and take-up reel servos. The heart of logic circuit 25 is simply a timer that is triggered whenever the capstan is started, stopped or changes direction. The logic is so constructed to induce either dynamic brake or plugging current into the respective servos during the time interval that logic circuit 25 is active depending on the position of the tape loops in the respective columns. Since dynamic brake is normally applied first, it is intuitively obvious that the faster moving loop will spend less of the allotted time as defined by the timer in the dynamic brake region of the loop box thereby allowing a greater length of time for the application of plugging current. In this manner the degree of deceleration applied to the servo motors is made somewhat proportional to the speed that a tape loop travels within the loop box, i.e., the loop box geometry, shown in FIG. 2, is made to determine the mix proportions between dynamic brake and plugging current such that over the wide range of initial tape loop velocities that occur when the capstan 41 is reversed, the respective reels 35 and 36 can be stopped before the loops exit the region between the C and F switches.

The logic of current programmer 11 which is identical to current programmer 13 is shown in detail in FIG. 3.

Referring to FIG. 3, the sensor switches A, B, C, F, G and H are shown. These switches close in response to a vacuum e.g., when they are between the tape loop and the bottom of the loop box and they are open in atmospheric pressure.

The switches A to H have one terminal connected to ground and the other terminal connected to a voltage source through a pull-up resistor.

The condition of switches is shown for the condition of the tape loop being between the C and F switches of the loop box 38. Note that switches D, E and I are not shown since they do not function to call up current.

The numerals 50 through 64 refer to the output terminals of the associated logic components shown. The terminals for switches F, G and H have not been assigned numerals because the logic of current programmer 11 functions the same when the drive area changes to these switches, e.g., when the tape is traveling in the reverse direction.

The logic of FIG. 3 has been designed to provide the highest current call-up which in a practical embodiment is 6.5 amps. When terminals 62, 63 and 64 are high, low and high, respectively. The next highest current call-up, e.g., 4.5 amps. is called for when the terminals 62, 63 and 64 are low, low and high, respectively. Sustained current (that could range from 0 to 2 amps. in a practical embodiment) is called for when terminals 62, 63 and 64 are low, high, low or low, low, low, respectively.

The logic of FIG. 3 which comprises inverters labeled I, OR gates labeled OR, exclusive OR gates labeled XOR, a NAND gate labeled NAND and AND gates labeled AND. The inverter and exclusive OR having output terminal 61 is a logical one shot multivibrator which is well known in the art. It provides a clock to the flip-flop 60 only when its input changes from a high to a low or a low to a high.

The logic of FIG. 3 functions as follows:

1. Tape loop between the C and F switches of loop box 38:

terminals 53, 54 and 55 are low resulting in terminals 58 and 60 being low.
terminals 60 and 54 being low resulting in terminals 57, low; 59, high; and 63, low.
terminals 59, high; and 54, low resulting in 62, low.
terminals 59, high; and 55, low resulting in 64, low.

Thus, terminals 62, 63 and 64 are all low which is a zero current call-up condition.

2. Tape loop moves from below C switch to area between B and C switches:

terminals 50 and 51 are low and terminal 52 is high resulting in terminals 53, low; 54, low; and 55, high.
terminal 58 is high and 60 is low.
terminals 60 and 54 are low resulting in 57, low.
terminals 56, high; and 57, low resulting in terminal 59, high; and terminal 63, low.
terminal 59, high; and 54, low gives 62, low.
terminals 59 and 55, high gives 64, high.

Thus, for this condition, terminals 62 and 63 are low and 64 is high. This calls up the lower current or 4.5 amps.

From following the logic, it can be shown that when the tape loop moves to the area between switches A and B the condition for highest current call-up is met, i.e., terminals 62 and 64, high; and terminal 63, low.

Also when the tape loop moves down from between the A and B switches to the area between B and C switches, the condition for sustaining current call-up is provided since terminals 62 and 64 are low and 63 is high.

When the tape loop is above the A switch, the highest current is called up because terminals 62 and 64 are high and 63 is low.

A drop of the tape loop to between switches A and B provides a sustaining current call-up situation.

It can be seen that as the tape moves up in the loop box, discrete currents are called for which accelerate the supply reel servo motor 24 which stops the upward movement; and when the tape moves down, a sustaining current is provided which ultimately causes the motor 24 to coast.

In the logic of FIG. 3, it should be noted that the flip-flop is clocked whenever the B switch is crossed in either direction.

While the actual circuitry between the current programmer and its associated current comparator for changing the logic outputs on terminals 62, 63 and 64 to the required current inputs is not shown, it may be done in any conventional way, e.g., a D/A converter circuit or simply several resistors in a summing junction arrangement.

When the tape transport is running under normal conditions, e.g., in the forward or reverse directions, the above described current programmer 11 and its identical counterpart current programmer 13 function as described to provide the outputs necessary to maintain the tape loops at or dithering about their equilibrium positions in their respective loop boxes 37 and 38.

When, however, the capstan 41 reverses direction, circuit 25 is activated by a capstan servo signal to provide an extraordinary emergency control. When, for example, the tape transport is moving tape in the forward direction as shown in FIG. 2, a capstan reversal results in tape moving into loop box 38 very rapidly, i.e., the supply reel 35 and capstan 41 are both contributing to the movement of tape into the loop box 38.

At the same time, this situation causes tape to be removed from loop box 37 at a rapid rate since take-up reel 36 and capstan 41 are both contributing to the removal.

Considering the forward running condition and remembering that the same concepts hold true for the reverse direction, the logic circuit 25 functions to stop the supply reel 35 before the tape loop reaches the F switch in the loop box 38. The tape loop starts in its downward movement from the circuits of the C switch, its equilibrium position for the forward direction. Stopping of the supply reel 35 before the F switch in loop box 38 is tripped places the tape loop in proper equilibrium position for when the supply reel is to be rotated in the reverse direction.

Likewise, the take-up reel 36 must be stopped before the tape loop in the loop box 37 starting at the F switch trips the C switch.

Considering the supply reel 35 and loop box 38, the logic 25 activated by a signal indicative of capstan reversal provides the dynamic brake signal to the drive logic 21. In a manner to be described more fully hereinbelow, this causes a short to be placed across the terminals of motor 24 resulting in deceleration of the motor 24. This input to the drive logic 21 overrides the normal drive and is in effect a dynamic braking of the motor 24.

If the dynamic brake has not stopped the motor 24 before the D switch in the loop box 38 is tripped, the dynamic brake signal is withdrawn; and a signal (high) is applied by the logic circuit 25 through OR gate 14 to the current comparator 15 which causes a reverse or plugging current to be applied to the motor 24. This plugging current forces current through the motor in opposition to its rotation. Thus, as can be seen in FIG. 1, the plugging current is fed to the appropriate current comparator 15 or 27 and takes the place of the normal current call-up from the current programmers and utilizes the same circuitry and pulse width modulation techniques as heretofore described.

The total combined length of time the dynamic brake and plugging current are in existence is chosen for the worst case condition, i.e., fully loaded reel moving at maximum speed such that the tape in loop box 38 is stopped before it trips the F switch or for loop box 37 before it trips the C switch.

The sample and hold circuit 16 is basically a D flip-flop (not shown) whose set and reset conditions determine whether the up-down counter 19 counts up or down. The flip-flop is clocked at the conclusion of each drive pulse. Thus, when the output of the flip-flop is holding a high, the up-down counter 19 counts down one making the next required drive pulse shorter. When the output of the flip-flop is clocked low at the end of the motor drive pulse, the up-down counter 19 counts up one thereby extending the drive pulse length.

Thus, the current comparator 15 effectively resets the flip-flop to provide a low on its output terminal when the feedback current from the motor 24 is less than that called up via the current programmer 11. When the feedback current from the motor 24 is greater than that called up from the current programmer 11, the flip-flop is set to provide a high on its output terminal.

The pulse width counter 18 provides an input to the flip-flop which clocks it at the end of each motor drive pulse which occurs substantially at the same time the count in the pulse width counter 18 reaches zero. Since the flip-flop will only change states on the occurrence of a clock pulse, it holds its high or low until such occurrence. Depending on the output from the current comparator, the flip-flop may stay in the same state through many clock pulses depending on whether the current comparison is positive or negative, i.e., a logic high or low, i.e., the relationship of the feedback current to the called-up current.

Figure 4:
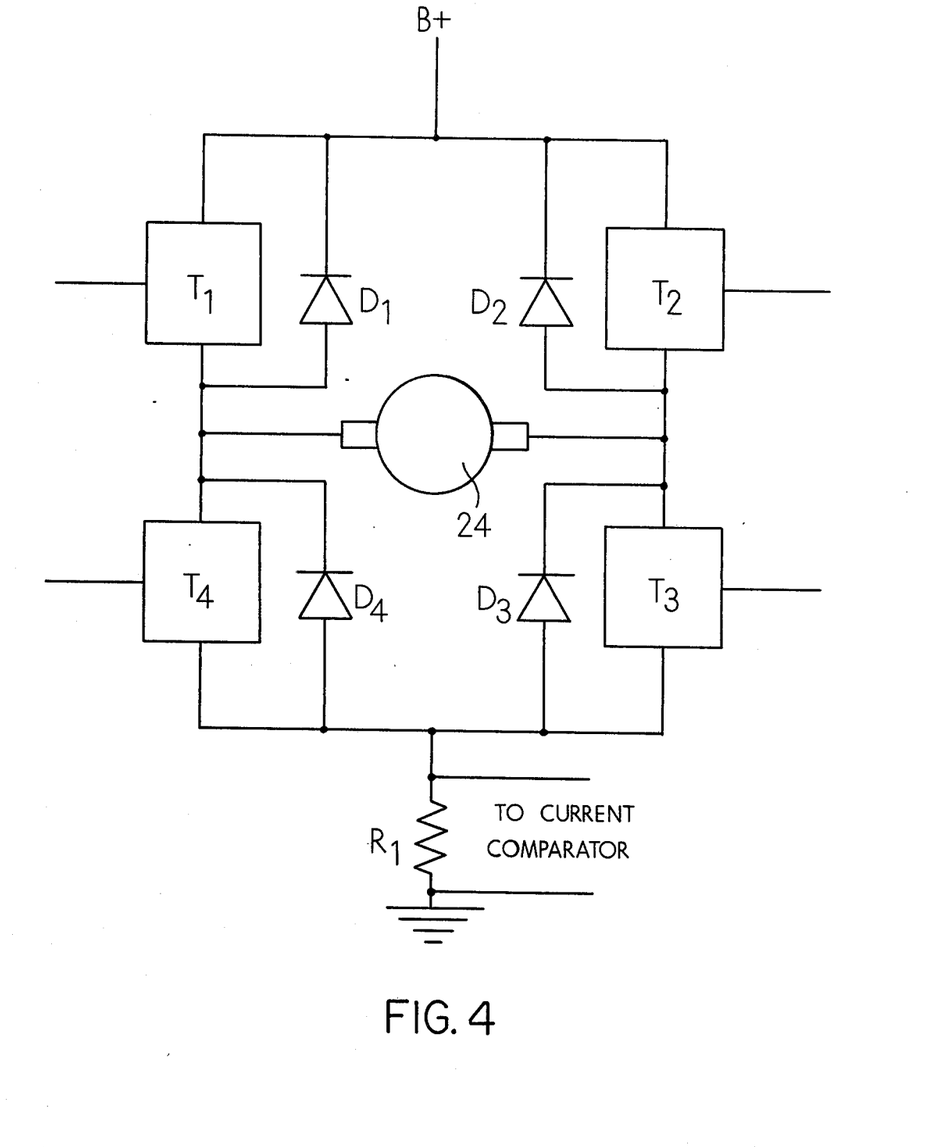
FIG. 4 shows the reel motor power drive circuitry.

FIG. 4 illustrates the power drive arrangement for the supply reel motor 24. It comprises a transistor $T_1$ connected between power source B+ and one side of motor 24, transistor $T_2$ connected between power source B+ and the other side of motor 24. A transistor $T_4$ connects the one side of motor 24 to ground through a resistance $R_1$ while a transistor $T_3$ connects the other side of motor 24 to ground through resistance $R_1$.

The transistors $T_3$ and $T_4$ determine direction of acceleration of the motor 25 by establishing current direction through the motor 24 while transistors $T_1$ and $T_2$ control the duration of the motor drive pulse in the selected direction.

The length of the drive pulse is determined by the pulse width counter 18 which is effectively connected to either transistor $T_1$ or $T_2$ through drive logic 21 depending on the required acceleration.

If the required acceleration is in the forward direction, transistor $T_3$ is turned on while transistor $T_1$ is turned on for the time it takes pulse width counter 18 to count down to zero. This establishes a current pulse left to right through motor 24, i.e., the current path is from B+ through transistor $T_1$, motor 24, transistor $T_3$, resistance $R_1$ to ground.

If the required acceleration is in the reverse direction, transistor $T_2$ is pulsed on for the interval established by the pulse width counter 18; and transistor $T_4$ is turned on establishing the current path from B+ through transistor $T_2$, motor 24, transistor $T_4$, resistance $R_1$ and ground, i.e., right to left through motor 24.

When transistors $T_1$ or $T_2$ are not being pulsed on, i.e., when current call-up to current comparator 11 has been zero long enough for up-down counter to have a zero count, motor 24 receives no drive pulses and coasts and decelerates.

The diodes $D_1$ through $D_4$ are protective devices to prevent damage to the transistors by reverse current caused by back EMF of the motor 24 when a current path is shut off. In addition diodes $D_3$ and $D_4$ provide the alternate current path that must exist between successive drive pulses in order to keep the current within the drive motor relatively constant.

The dynamic brake previously discussed is achieved by turning both transistors $T_3$ and $T_4$ on to short the terminals of the motor 24 while at the same time maintaining transistors $T_1$ and $T_2$ off.

The dynamic brake overrides the normal operation of the system through the drive logic 21.

It should be noted also that the plugging current previously discussed is achieved by reversing the normal conducting path of the motor drive circuit of FIG. 4. Thus, when the transport is moving tape in the forward direction with transistor $T_3$ on and transistor $T_1$ being pulsed on, plugging or reverse current is established by changing the conductive path and making it transistor $T_2$ that is being pulsed and $T_4$ turned on.

The feedback signal representative of the drive motor current is taken from across the resistance $R_1$ and sent to current comparator 15.

Figure 5:
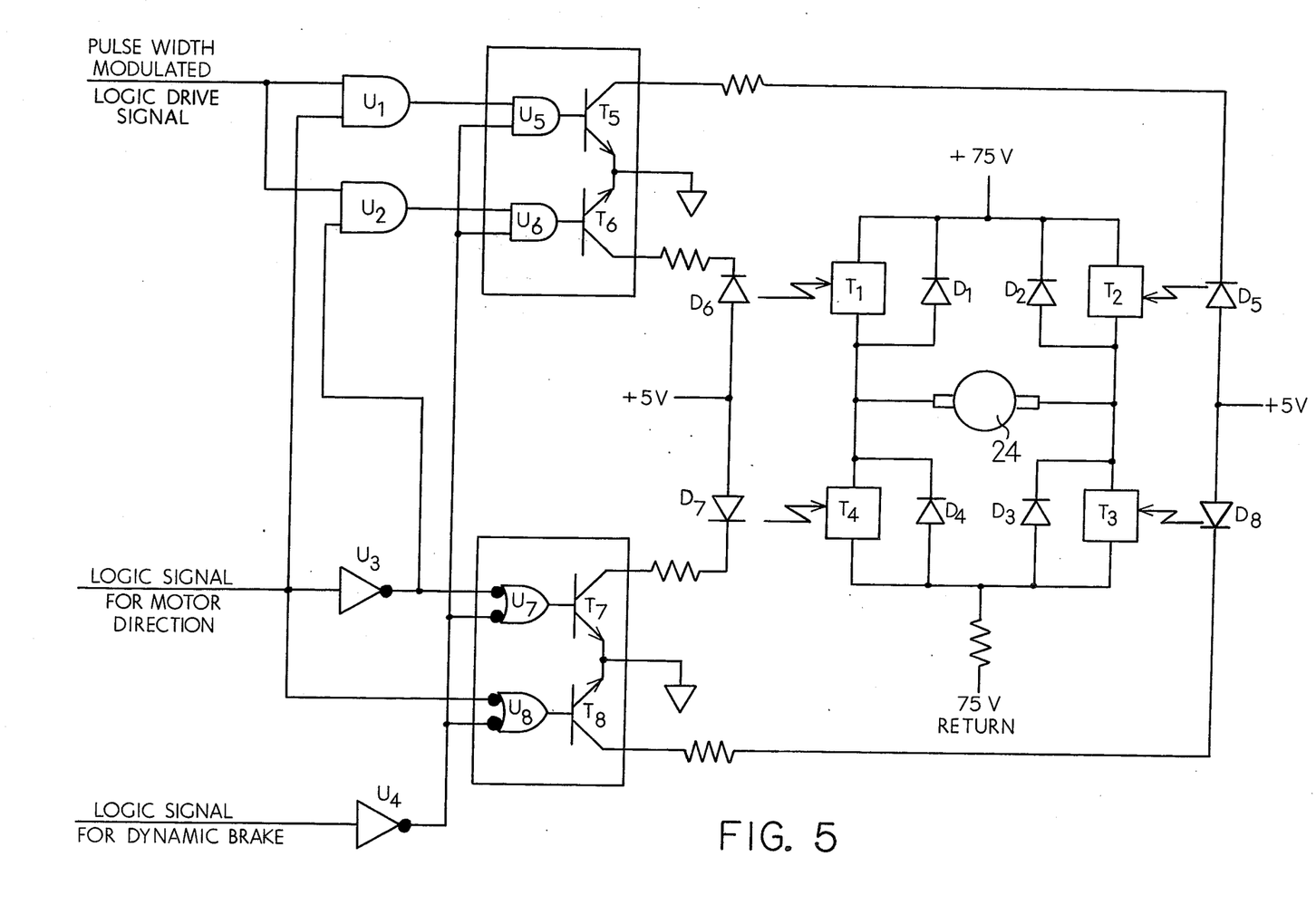
FIG. 5 illustrates the drive logic circuitry associated with the power drive circuitry of FIG. 4.

FIG. 5 illustrates the logic arrangement of drive logic 21 or drive logic 31.

Each drive logic 21 or 31 has three inputs. Considering drive logic 31, it receives inputs from the pulse width counter 18, from the one shot logic circuit 25 and from the tape-loop-position sensor.

The input from the pulse width counter 18 determines the length of the motor drive pulse by turning transistors $T_1$ or $T_2$ on for the duration of the pulse width counter 18.

The signal from the tape-loop sensor 12 which is effectively a signal provided when the D switch in the associated loop box is tripped by the tape loop. This controls which of the transistors $T_1$ through $T_4$ are on or off and, therefore, the direction of acceleration drive current through the motor 24.

The signal from the logic circuit 25 provides an override which initiates the dynamic brake by causing transistors $T_3$ and $T_4$ to turn on and transistors $T_1$ and $T_2$ to turn off.

Referring more particularly to FIG. 5, there is shown a pair of AND gates $U_1$ and $U_2$. Each of these AND gates has an input from the pulse width counter 18 which effectively provides a high to each AND gate $U_1$ and $U_2$ for the time the pulse width counter 18 counts down to zero.

The AND gate $U_1$ and NAND gate $U_8$ receive inputs from the tape-loop-position sensor, and AND gate $U_2$ receives the same input through an inverter $U_3$. This input is high for the forward direction and low for the reverse direction of motor 24.

The motor of inverter $U_3$ is also connected to NAND gate $U_7$.

NAND gates $U_7$ and $U_8$ and AND gates $U_5$ and $U_6$ receive the dynamic brake input from the one shot circuit 25 through an inverter $U_4$.

AND gates $U_5$ and $U_6$ receive inputs from AND gates $U_1$ and $U_2$, respectively.

The transistor $T_5$ has its base connected to the output of AND gate $U_5$ while the output of AND gate $U_6$ is connected to the base of transistor $T_6$. The emitters of transistors $T_5$ and $T_6$ are connected to ground.

The bases of transistors $T_7$ and $T_8$ are connected to the outputs of NAND gates $U_7$ and $U_8$, respectively. The emitters of transistors $T_7$ and $T_8$ are connected to ground.

Photo diodes $D_5$ and $D_6$ have one end connected to the collectors of transistors $T_5$ and $T_6$ through current limiting resistors, respectively, and the other end connected to a B+ source in the polarity shown.

Photo diodes $D_7$ and $D_8$ have one end connected to the collectors of transistors $T_7$ and $T_8$, respectively, through current limiting resistors and the other end connected to the B+ source in the polarity shown.

The diodes $D_5$, $D_6$, $D_7$ and $D_8$ are disposed asjacent to light-sensitive transistors $T_2$, $T_1$, $T_4$ and $T_3$, respectively, and function when energized to turn on the transistors. This arrangement isolates the logic 21 from the motor power drive 23 and provides logic control of the motor power drive. Such optical coupling and power transistor arrangements are well known in the art.

The dynamic brake logic signal overrides normal operation of the power drive 23. A high at the input of inverter $U_4$ turns transistors $T_5$ and $T_6$ off and transistors $T_7$ and $T_8$ on. Diodes $D_7$ and $D_8$ are thus energized to turn transistors $T_3$ and $T_4$ on while diodes $D_5$ and $D_6$ are unenergized which turns or maintains transistors $T_1$ and $T_2$ in the off condition. Thus, motor 24 is shorted and, therefore, braked by its own reverse EMF.

A low at the input of inverter $U_4$ enables the inputs for the pulse width modulated motor drive pulse and direction of the motor 24.

For this condition a high at the input of inverter $U_3$ turns transistor $T_7$ on and, therefore, transistor $T_4$ is turned on. Also, a high at the input of inverter $U_3$ enables AND gate $U_1$ and disables AND gate $U_2$. Thus, only transistor $T_5$ can be turned on by the pulse width modulated drive signal. Thus, if transistor $T_1$ is selected by the motor direction logic only transistor $T_2$ can be turned on by the pulse width modulation signal.

In a similar manner motor 24 is energized in the opposite direction utilizing transistors $T_1$ and $T_3$ which occurs when the input to inverter $U_3$ is low.

The system has been described with reference to the supply reel motor 24. As previously pointed out, the system which controls the take-up reel motor 34 functions in an identical manner with the loop positions in their respective loop boxes assuming different positions depending on the direction of tape.

It should be noted that the plugging current previously discussed, i.e., reverse current to the motor is applied by changing the logic signal to inverter $U_3$ which automatically occurs when the D switch is tripped in the appropriate vacuum loop box.

Other modifications of the present invention are possible in the light of the above description, and no limitations should be placed on the invention other than those set forth in the following claims.

What is claimed is:

1. A tape reel servo control system for use in a tape transport system comprising in combination:
   a supply reel;
   a take-up reel;
   a tape drive capstan;
   a first vacuum loop box for receiving a tape loop between said supply reel and said capstan;
   a second vacuum loop box for receiving a tape loop between said capstan and said take-up reel;
   a motor responsive to drive pulses for driving each of said supply and take-up reels;
   first means for controlling the acceleration of each of said motors in accordance with the position of a tape loop within its associated loop box; said first means for each of said motors, comprising:
   a tape loop sensor means for providing an output indicative of the position of a tape loop within its associated loop box;
   current programmer means connected to said tape loop sensor means for providing one of several discrete current levels as an output dependent on the position of said tape loop in its associated loop box;
   current comparator means connected to said current programmer means;
   feedback means for connecting a feedback signal from the associated motor to said current comparator means;
   digital means comprising:
   an up-down counter;
   a hold circuit connected between said current comparator means and said up-down counter;
   a pulse width counter connected to said up-down counter for receiving the counter in said up-down counter at the end of each of said drive pulses;
   a clock pulse source connected to said pulse width counter;
   said hold circuit causing said up-down counter to count up one or down one at the end of each motor drive pulse depending on whether the current from said current programmer means is greater or lesser than said feedback signal provided by said feedback means; and
   said pulse width counter counting down to zero at the end of each motor drive pulse from the adjusted count registered therein.

2. A tape reel servo control system according to claim 1 further including;

second means responsive to a change in direction of said capstan for shorting the terminals of said associated motor until the tape loop reaches a predetermined position within its associated loop box and thereafter to cause a reverse current to be applied to said motor whereby said shorting and said reverse current combine to stop said motor within a predetermined time.

3. A tape reel servo control system according to claim 1 in which said digital means further includes;
control means connected between said pulse width counter and said motor for controlling the direction of rotation and the application of said motor drive pulses to said motor.

4. A tape reel servo control system according to claim 3 wherein said control means comprises;
power drive means connected to said motor,
drive logic means connected between said pulse width counter and said power drive means,
means connecting said tape loop sensor means to said drive logic means for providing an input thereto indicative of the desired direction of rotation of said motor whereby said drive logic means causes said power drive means to apply power to said motor for the duration of each of said drive pulses in said desired direction.

5. A tape reel servo control system according to claim 4 wherein said power drive means comprises;
an electrical power source,
first transistor means connected between said power source and one terminal of said motor,
second transistor means connected between said power source and the other terminal of said motor,
a resistance connected to ground,
third transistor means connected between said one terminal of said motor and said resistance,
fourth transistor means connected between said other terminal of said motor and said resistance,
said drive logic means including means to turn said third transistor means on and pulse said second transistor means on during said motor drive pulse to energize said motor in one direction and to turn said fourth transistor means on and pulse said first transistor means on during said motor drive pulse to energize said motor in the other direction.

6. A tape reel servo control system according to claim 5 wherein said drive logic means further comprises means responsive to a reversal of capstan direction for turning said third and fourth transistor means on and said first and second transistor means off for shorting the motor terminals whereby said motor is decelerated.

7. A tape reel servo control system according to claim 6 wherein said drive logic means includes means responsive to the tape loop passing a predetermined point in its associated loop box to stop shorting said motor terminals and causing current to flow through said motor in a direction opposing the direction of motor rotation.

8. A tape reel servo control system according to claim 1 wherein each of said first and second loop boxes comprise;
an upper drive region comprising three vacuum switches and a lower drive region comprising three vacuum switches and a middle switch,
each of said switches in said upper and lower drive regions connected to its associated current programmer means which provide output current levels to said current comparator means for maintaining the tape loop in the vicinity of the upper drive region of said first loop box and in the vicinity of the lower drive region of said second loop box when the tape transport is moving in a first direction and for maintaining the tape loop in the vicinity of the lower drive region in the first loop box and in the vicinity of the upper drive region of said second loop box when the tape transport is moving in a second direction.

9. A tape reel servo control system according to claim 8 wherein each of said middle switches is connected to its associated drive logic means to provide tape loop direction signals thereto.

10. A tape reel servo control system according to claim 9 wherein each of said drive logic means receives a signal to cause said motor terminals to be shorted when said capstan changes direction and to cause a reverse current to be applied to said motor when said middle switch is tripped by the tape loop.

11. A tape reel servo control system according to claim 10 wherein each of said drive logic means receives a signal in response to its associated tape loop moving out of its normal drive region to cause said motor terminals to be shorted.

12. A tape reel servo control system according to claim 11 wherein said drive logic means is optically coupled to said power drive means.

13. A tape reel servo control system for use in a tape transport system of the type employing a vacuum loop box disposed to receive a tape loop between a supply reel and a tape drive capstan and a vacuum loop box between the capstan and a take-up reel, comprising in combination:
motor means for driving each of the supply and take-up reels,
first means for controlling the acceleration and direction of rotation for each of said motor means in accordance with the position of a tape loop in its associated loop box, said first means, for each of said motor means comprising:
current programmer means providing discrete current levels as outputs dependent on the position of the tape loop in its associated loop box;
current comparator means connected for receiving the outputs of said current programmer means;
feedback means for connecting feedback signals from the associated motor means to said current comparator means;
digital means connected to said current comparator means and comprised of a pulse width counter, an up-down counter, a hold circuit and a clock pulse source for generating motor drive pulses having time intervals indicative of the difference between the signals applied to said current comparator means;
second means connecting said digital means to said associated motor means whereby said motor means is driven by said motor drive pulses.

14. A tape reel servo control system according to claim 13 wherein said first means for controlling each of said motor means further includes;
third means for controlling the shorting of the terminals of said associated motor means when said tape moves out of its equilibrium position within the associated vacuum loop box in a predetermined direction whereby said motor means is decelerated.

15. A tape reel servo control system according to claim 14 wherein said first means, for controlling each of said motor means, further includes;
 fourth means responsive to a change in the direction of said capstan to short the terminals of said associated motor means until the tape reaches a predetermined position within its associated loop box and thereafter to apply reverse current to said associated motor means for a predetermined time whereby said shorting and reverse current combine to stop said associated motor means from rotating its associated reel.

16. A tape reel servo control system according to claim 13 wherein said second means comprises;
 power drive means connected to said motor,
 drive logic means connected between said pulse width counter and said power drive means,
 means connecting a direction call signal to said drive logic means for providing an input thereto that is indicative of the desired direction of rotation of said associated motor means whereby said drive logic means causes said power drive means to apply power to said motor for the duration of each of said motor drive pulses in said desired direction.

17. A tape reel servo control system according to claim 16 wherein said power drive means comprises;
 an electrical power source,
 first transistor means connected between said power source and one terminal of said motor,
 second transistor means connected between said power source and the other terminal of said motor,
 a resistance connected to ground,
 third transistor means connected between said one terminal of said motor and said resistance,
 fourth transistor means connected between said other terminal of said motor and said resistance,
 said drive logic means including means to turn said third transistor means on and pulse said second transistor means on during said motor drive pulse to energize said motor in one direction and to turn said fourth transistor means on and pulse said first transistor means on during said motor drive pulse to energize said motor in the other direction.

18. A tape reel servo control system according to claim 17 wherein said drive logic means further comprises means responsive to a reversal of capstan direction for turning said third and fourth transistor means on and said first and second transistor means off for shorting the motor terminals whereby said associated motor means is decelerated.

19. A tape reel servo control system according to claim 18 wherein said drive logic means includes means responsive to the tape loop passing a predetermined point in its associated loop box to stop shorting said motor terminals and causing current to flow through said motor in a direction opposing the direction of motor rotation.

20. A tape reel servo control system for use in a tape transport system of the type employing control means to control two reel motors for maintaining the tape in an equilibrium position, characterized by:
 digital means comprising a pulse width counter having a preset non-zero count and an up-down counter incrementing or decrementing said preset non-zero count for generating reel motor drive pulses whose time durations are a function of said preset non-zero count, said reel motor drive pulse time durations being indicative of the difference between desired and actual reel motor acceleration.

* * * * *

UNITED STATES PATENT AND TRADEMARK OFFICE
CERTIFICATE OF CORRECTION

PATENT NO. : 4,065,074
DATED : December 27, 1977
INVENTOR(S) : David R. Anderson et al It is certified that error appears in the above-identified patent and that said Letters Patent are hereby corrected as shown below:

Column 1, line 38, the second "as" should be --a--.

Column 2, line 59, "of" should be --for--.

Column 8, line 17, "capstan 41 direction" should be --capstan 41 reverses direction--.

Column 9, line 41, "When" should be --when-- since it is not the beginning of a new sentence.

Column 12, line 4, "motor 25" should be --motor 24--.

Claim 1, column 14, line 53, the second "counter" should be --count--.

Signed and Sealed this

Eleventh Day of April 1978

[SEAL]

Attest:

RUTH C. MASON
Attesting Officer

LUTRELLE F. PARKER
Acting Commissioner of Patents and Trademarks